(12) United States Patent
Minetti

(10) Patent No.: US 11,049,411 B2
(45) Date of Patent: Jun. 29, 2021

(54) PAGE TURNING DEVICE FOR A MUSICAL INSTRUMENT AND SYSTEM

(71) Applicant: Alfredo Minetti, Bloomington, IN (US)

(72) Inventor: Alfredo Minetti, Bloomington, IN (US)

( * ) Notice: Subject to any disclaimer, the term of this patent is extended or adjusted under 35 U.S.C. 154(b) by 0 days.

(21) Appl. No.: 16/440,390

(22) Filed: Jun. 13, 2019

(65) Prior Publication Data
US 2019/0385474 A1 Dec. 19, 2019

Related U.S. Application Data

(60) Provisional application No. 62/684,522, filed on Jun. 13, 2018.

(51) Int. Cl.
*G09B 15/02* (2006.01)
*G10H 1/00* (2006.01)

(52) U.S. Cl.
CPC .................... *G09B 15/023* (2013.01)

(58) Field of Classification Search
CPC ...... G06F 3/1446; G10G 1/00; G10H 1/0008; G10H 2220/015; G10H 1/368; G10H 2220/091; G10H 2220/201; G09B 15/023; G09B 15/02; G09B 15/00; G09B 5/12; G09B 15/002; G10C 3/26
See application file for complete search history.

(56) References Cited

U.S. PATENT DOCUMENTS

| | | | | |
|---|---|---|---|---|
| 5,760,323 A * | 6/1998 | Romero | ............... | G10H 1/0008 84/470 R |
| 6,107,558 A * | 8/2000 | Cowan | ..................... | B42D 9/04 84/486 |
| 7,119,266 B1 * | 10/2006 | Bittner | ................. | G09B 15/023 84/477 R |
| 8,431,809 B1 * | 4/2013 | Chan | ...................... | G09B 15/02 84/470 R |
| 9,035,165 B2 | 5/2015 | Cho | | |
| 2003/0110926 A1 * | 6/2003 | Sitrick | ................. | G09B 15/023 84/477 R |
| 2008/0060500 A1 * | 3/2008 | La | ............................ | G10G 1/00 84/486 |
| 2009/0217803 A1 * | 9/2009 | Guo | ......................... | G10G 1/00 84/477 R |
| 2011/0132181 A1 * | 6/2011 | Kockovic | ................ | G10H 1/34 84/723 |
| 2014/0123834 A1 * | 5/2014 | Wang | ...................... | B42D 9/04 84/486 |
| 2014/0216233 A1 * | 8/2014 | Zhonggang | ............... | G06F 3/02 84/486 |
| 2014/0320442 A1 * | 10/2014 | Chan | .................... | G09B 15/023 345/174 |

(Continued)

*Primary Examiner* — Marlon T Fletcher
(74) *Attorney, Agent, or Firm* — Brannon Sowers & Cracraft PC

(57) ABSTRACT

A system for controlling a display of digital sheet music includes a musical instrument having a pedal, a computer including a display for displaying sheet music, and a page turning device fitted upon the pedal and communicatively coupled with the computer. The device has circuitry, which includes one or more sensors, a control mechanism, a power source, and a transmitter. Upon the user activating the page turning device, the control circuitry generates a sensor signal and outputs a page turning command to the computer.

19 Claims, 5 Drawing Sheets

(56) References Cited

U.S. PATENT DOCUMENTS

| | | | |
|---|---|---|---|
| 2015/0294656 A1* | 10/2015 | Hanuschak | G10H 1/0556 |
| | | | 84/453 |
| 2015/0364055 A1* | 12/2015 | Oliver | G09B 15/023 |
| | | | 84/746 |
| 2016/0189694 A1* | 6/2016 | Cowan | G10G 1/00 |
| | | | 84/477 R |
| 2018/0322856 A1* | 11/2018 | Liu | G10H 1/0016 |
| 2019/0385474 A1* | 12/2019 | Minetti | G09B 15/023 |

* cited by examiner

PAGE TURNING DEVICE FOR A MUSICAL INSTRUMENT AND SYSTEM

TECHNICAL FIELD

The present disclosure relates generally to musical instruments and, more particularly, to controlling a display of digital sheet music.

BACKGROUND

For centuries, musicians have relied on written sheet music to guide their performing of musical scores. For just about as long, the task of turning the pages of a written score has been problematic. As a musician's hands are typically engaged in manipulating his or her instrument, when the time comes to advance to the next page of the written composition, the musician typically must momentarily discontinue playing to turn the page or even have a person next to them dedicated to that particular task.

However, relatively recently, advances in technology have allowed for development in this field. Notably, written sheet music is, with increasing frequency, being rendered in a virtual, computer-displayable form generally known as "digital sheet music." Digital sheet music may be advantageous over traditional sheet music in a number of ways. For example, musicians may be able to retain and transport vast collections of written music, something not possible previously. Further, digital sheet music has fueled efforts to develop hardware and software solutions to many issues that have long been problematic in the performing of musical scores. While this new medium has changed the way many read, use, store, and transport sheet music, it has also led to efforts to address the problem of advancing or otherwise turning the pages of a score without interrupting a performance.

One such strategy is disclosed in U.S. Pat. No. 9,035,165 to Cho ("Cho"). Cho teaches a hands-free method of advancing an electronic display of digital sheet music through use of a stand-alone control pedal communicatively coupled with the display device. Cho's pedal is apparently designed to provide a single stand-alone pedal that has the functionality of prior multi pedal systems. While this and other strategies may allow for the hands-free advancement of digitally displayed sheet music under certain conditions, there remains ample room for improvement and development of alternative strategies.

SUMMARY OF THE INVENTION

In one aspect, a page turning device for changing a display of digital sheet music includes a body structured to removably fit the page turning device upon a musical instrument pedal, and control circuitry coupled with the body, and including a sensor structured to produce a sensor signal responsive to a user contacting the page turning device, a power supply, a wireless transmitter, and a control mechanism structured to receive the sensor signal and responsively output a page turning command to a computer by way of the wireless transmitter.

In another aspect, a system for controlling a display of digital sheet music includes a musical instrument pedal, a computer having a display for displaying digital sheet music, and a page turning device. The page turning device is fitted upon the pedal and communicatively coupled with the computer. The page turning device includes a power supply, a sensor structured to produce a sensor signal responsive to a user contacting the page turning device, a control mechanism structured to output a page turning command responsive to the sensor signal, and a transmitter. The page turning device is fitted upon the pedal and communicatively coupled with the computer.

In still another aspect, a method of reading or displaying digital sheet music includes activating a page turning device fitted upon a musical instrument pedal, producing a sensor signal responsive to the activating of the page turning device, and changing a computer display responsive to the sensor signal.

DETAILED DESCRIPTION

Figure 1:
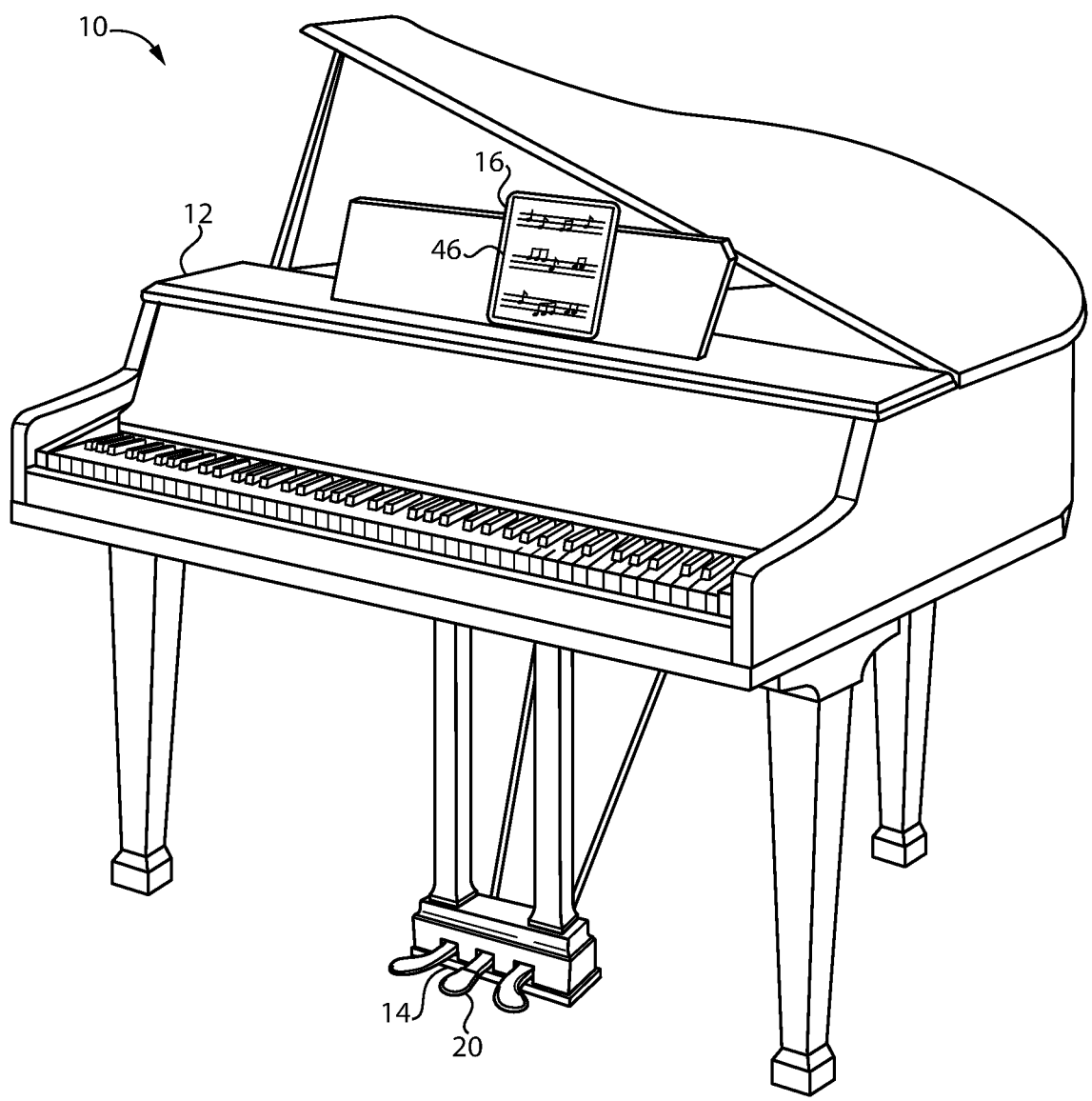
FIG. 1 is a diagrammatic view of a system for controlling a display of digital sheet music, according to one embodiment.

Referring now to FIG. 1, a system for controlling a display of digital sheet music ("system") 10 is shown. System 10 includes a musical instrument 12 that has one or more pedals 14, a computer 16, and a page turning device ("device") 20 that is structured to attach to musical instrument 12 and communicatively couple with computer 16 to permit a user to control a display of digital sheet music. Musical instrument 12 may be a keyboard instrument such as a string piano, an electric piano, an organ, or the like (hereinafter "piano 12"), although system 10 is not thusly limited. In other embodiments, system 10 might be deployed in connection with a different type of musical instrument or structured to control a display of media other than digital sheet music.

Figure 2:
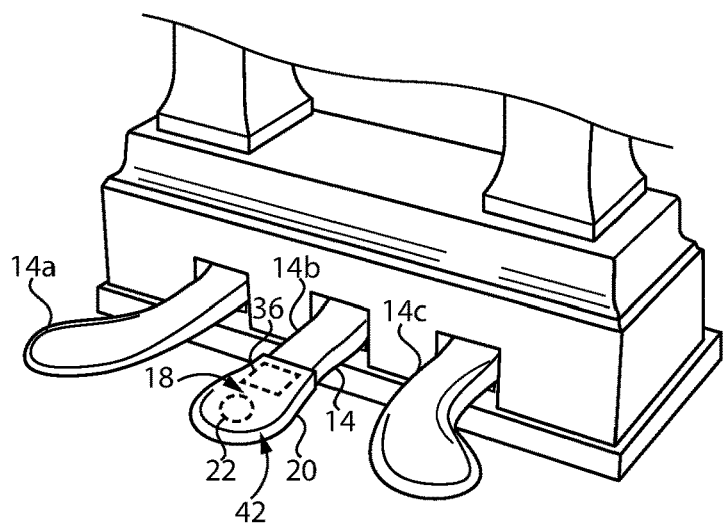
FIG. 2 is a diagrammatic view of a page turning device, according to one embodiment.
Figure 3:
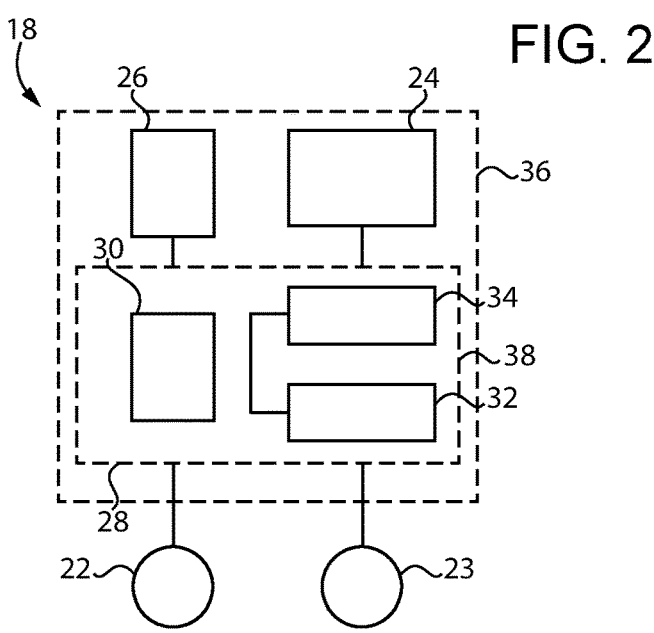
FIG. 3 is a schematic illustration of control circuitry for a page turning device, according to one embodiment.

Referring now also to FIG. 2, an enlarged view of pedals 14 is shown. Device 20 includes control circuitry 18 structured to detect an instance of a user activating device 20 by contacting device 20, and transmit a page turning command responsive thereto. Control circuitry 18 includes a sensor 22 structured to detect a parameter or a change in a parameter indicative of a user activating device 20 by, for instance, tapping, hitting, or touching a surface of device 20, and output a sensor signal responsive thereto. Sensor 22 may be a tactile sensor, such as a capacitive sensor, a resistive touch sensor, a piezoelectric sensor, a piezoresistive sensor, a membrane sensor or membrane switch, an optical sensor, a magnetic sensor, an electromechanical switch, a binary sensor, or any other suitable type of sensor capable of directly or indirectly detecting an instance of a user activating device 20 by contacting. In an embodiment, circuitry 18 could be structured to detect whether a user, within a certain time period, tapped device 20 once, twice, three times, and so on. In some embodiments, sensor 22 might be structured to monitor different and/or additional parameters to detect the way in which a user activates device 20. For example, sensor 22 may be structured to detect a magnitude of force applied to device 20, a length of time that a user has engaged device 20, or a length of time between taps. In still other embodiments, sensor 22 might be structured to detect if a user swipes device 20 in a certain direction, to detect and identify a particular location on pedal 14 that the user engages, or to detect or identify any other action the user takes with respect to device 20. As can be seen in FIG. 3, device 20 may further include a second sensor 23 structured to output a second sensor signal (wherein the sensor signal output by sensor 22 is a first sensor signal) indicative of a user contacting page turning device 20. Sensor 23 may be similar in structure and function to sensor 22, although in some embodiments, sensor 23 may be structured differently than sensor 22, or may perform a different function or respond to a different type of stimulus than sensor 22. For instance, in an embodiment, sensor 22 might be structured to cause computer 16 to advance the display of digital sheet music and sensor 23 might be structured to cause computer 16 to display an earlier page of the digital sheet music such as an immediately preceding page. It will be appreciated that certain embodiments of device 20 might only include a single sensor 22. In still other embodiments, device 20 might include three or more sensors.

Control circuitry 18 further includes additional components for receiving the sensor signals and outputting a control signal, which includes a page turning command (hereinafter, "page turning command"), to computer 16 that is responsive to the first or the second sensor signal. In FIG. 3, a schematic view of control circuitry 18 is shown. In addition to sensors 22, 23, control circuitry 18 may include a power source 24, which may be a battery (hereinafter "battery 24"), a transmitter 26, and a control mechanism 28. In some embodiments, device 20 might include different or additional components for controlling or using device 20, such as buttons, switches, or the like that may be used to facilitate pairing device 20 with computer 16, for turning device 20 on or off, or for any other purpose.

Transmitter 26 is structured to communicatively couple device 20 with computer 16 via a wired or wireless connection. In an exemplary embodiment, transmitter 26 is a Bluetooth® antenna. In other embodiments, transmitter 26 could be an antenna structured to transmit signals by way of wireless USB, Bluetooth Low Energy, Zigbee®, Z-Wave®, Wi-Fi™, RFID, NFC, GSM, CDMA, LTE, RF, or IR technologies, or by any other suitable wireless technology, protocol, range of frequencies, or the like. In still other embodiments, transmitter 26 could be a port or similar structure for receiving a wired connection, such as USB, HDMI, or other suitable type of wired connection.

Control mechanism 28 is communicatively coupled with sensors 22, 23 such that control mechanism 28 can receive the first and second sensor signals from sensors 22, 23, respectively. Control mechanism 28 may include a processor 30, a memory 32, and power circuitry 34. Amongst other things, processor 30 may be structured to execute instructions and communicate with other components of control circuitry 18 by, for example, sending signals to or receiving signals from other circuitry components. For instance, processor 30 might translate, adapt, or repackage the sensor signals for transmission to computer 16, or otherwise generate the page turning command responsive to the sensor signals for transmission to computer 16. Processor 30 might include a microprocessor, a microcontroller, or a field programmable gate array (FPGA), for example. Control mechanism 28 may also include memory 32, which might be communicatively coupled with processor 30 and structured to store data and/or computer-executable instructions. Memory 32 could include RAM, ROM, DRAM, SDRAM, Flash, or still another type of memory. Power circuitry 34 may be structured to convert power supplied from battery 24 to a particular voltage necessary or desirable for operation of one or more components of device 20, amongst other things. As can be seen, each of control mechanism 28, battery 24, and transmitter 26 may be packaged together in a common housing 36. In other embodiments, housing 36 may include different or additional components of control circuitry 18 or device 20, such as sensors 22, 23. In still other embodiments, device 20 might not include housing 36 at all.

Figure 4:
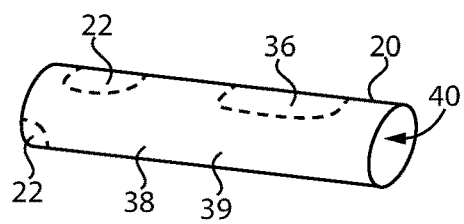
FIG. 4 is a diagrammatic view of a page turning device, according to one embodiment.
Figure 5:
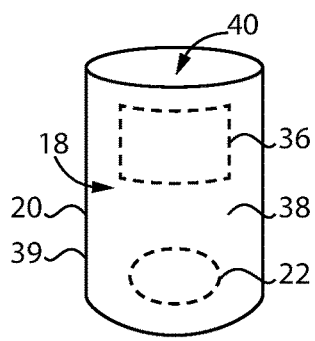
FIG. 5 is a diagrammatic view of a page turning device, according to one embodiment.

Referring now also to FIGS. 4 and 5, side and top views of device 20 are shown, respectively. Device 20 may include a sleeve 38 having a deformable body 39 for removably coupling device 20 with pedal 14. Sleeve 38 may be generally tubular in shape in some embodiments, with one end being closed and the other end forming an opening 40. In other embodiments, body 39 may have a sack portion at one end that fits over the end of the musical instrument pedal, and a shaft or shaft-like portion attached to the sack portion and extending along a top surface of the pedal. Such an embodiment, similar to those further discussed below, can still be understood to be or include a sleeve. Still other embodiments discussed and contemplated herein may have structures that are not sleeves or sleeve-like.

In some embodiments, sleeve 38 might be structured to be fitted upon a pedal 14 having a particular size or shape. For example, sleeve 38 may have a polygonal structure, with a horizontal dimension being greater than a vertical dimension for fitting upon a modern electrical keyboard pedal 14. Deformable body 39 may be formed of a stretchable, elastic material that allows sleeve 38 to be stretch-fit upon pedal 14. For example, deformable body 39 may be formed of an elastomer material, such as saturated or unsaturated rubbers, or might be formed of a stretchable, elastic fabric that might include an elastomeric fiber or a blend of elastomeric fibers. Still other materials are listed below in connection with other embodiments, including but not limited to silicone, silicone rubber, or another silicone-based material, for example. In such an embodiment, sensor 22 or sensor 23 might be a capacitive sensor structured to detect when a conductive surface contacts device 20. In a practical implementation strategy, a user of such an embodiment could have a piece of conductive material attached to his or her footwear such that device 20 is activated by contacting the conductive material to device 20. In this way, pedal 14 might be usable both to turn pages on computer 16 and for the purpose for which it was originally intended (e.g., producing, controlling, or manipulating an output of musical notes or compositions), without decoupling device 20.

Figure 6:
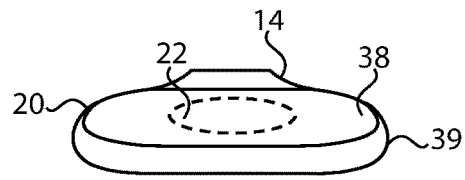
FIG. 6 is a diagrammatic view of a page turning device upon a pedal, according to one embodiment.
Figure 7:
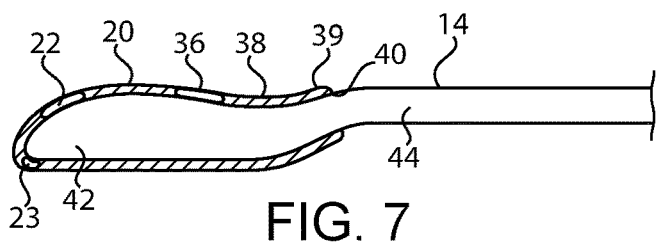
FIG. 7 is a partially sectioned side view of a page turning device upon a pedal, according to one embodiment.

Referring now also to FIGS. 6 and 7, front and partially sectioned side views of device 20 upon pedal 14 are shown, respectively. As can be seen, sleeve 38 may be stretched over pedal 14 such that deformable body 39 conforms, at least in part, to the contours of pedal 14. The stretchable, elastic material from which deformable body 39 may be formed allows opening 40 to expand to receive a head portion ("head") 42 of pedal 14, which may be wider than a neck portion ("neck") 44 of the pedal 14. Once upon pedal 14, opening 40 may compress or contract around neck 44. In this way, device 20 may be securely, but removably, positioned upon pedal 14 in a manner that permits device 20 to remain in place while piano 12 is in use. As can be seen, sensors 22, 23 might be positioned within a top side and a bottom side of device 20, respectively, although other arrangements are also contemplated. For instance, both sensors 22, 23 might be within the top side, or one or both could be positioned within a right side or a lift side of device 20. The terms "right" and "left," and "top" and "bottom" are used herein in a relative sense, each in relation to each other when viewing piano 12 or device 20, and should not necessarily be taken to mean that either has a particular orientation.

Figure 8:
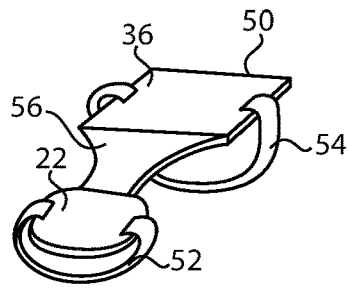
FIG. 8 is a diagrammatic view of a page turning device, according to another embodiment.
Figure 9:
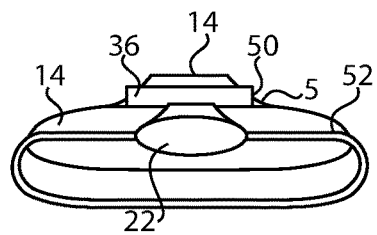
FIG. 9 is a diagrammatic view of the page turning device of FIG. 8 upon a pedal.
Figure 10:
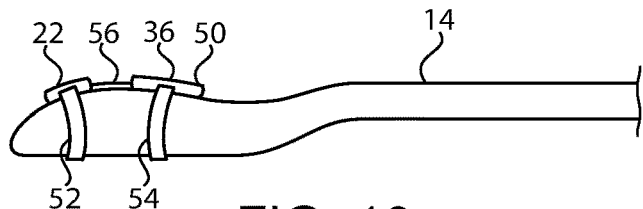
FIG. 10 is another diagrammatic view of the page turning device of FIGS. 8 and 9 upon a pedal.

In other embodiments, different strategies may be used to attach device 20 to pedal 14. Referring now to FIGS. 8-10, a page turning device ("device") 50 is shown according to another embodiment in which device 50 is attached to pedal 14 by one or more straps. It should be noted that like reference numerals will be used to describe like features across different embodiments without further explanation, it being understood that such features may be identical in construction and function to their counterparts discussed above. Where different reference numerals are used for identical or similar features across different embodiments, the corresponding element names and numbers will be provided for reference. It should nevertheless be appreciated that no limitation is intended by way of the use of any particular reference numeral. Material differences between embodiments will be discussed herein. Absent such discussion, different embodiments should generally be understood to be alike in structure and function. In FIG. 8, device 50 is illustrated without pedal 14, and shows device 50 having a first strap 52 attached to sensor 22 and a second strap 54 attached to a housing 36. It will be appreciated that device 50 of the present embodiment does not include a second sensor, although embodiments in which device 50 further includes one or more additional sensors are also contemplated. Housing 36 and sensor 22 may be coupled by way of a flexible connection 56 structured to permit control mechanism 28 to receive the sensor signal. Flexible connection 56 may, for example, include wires or other structures for conducting or otherwise carrying signals between device components. FIGS. 9 and 10 show device 50 according to the present embodiment attached to pedal 14. As can be seen, both sensor 22 and housing 36 are positioned on top of pedal 14, with straps 52, 54 extending around pedal 14 to secure each component in place. Straps 52, 54 might be formed of a stretchable, elastic material capable of expanding to fit snugly around pedal 14, or might include clips, hooks and clasps, buttons, latches, or the like to tighten straps 52, 54 around pedal 14. In other embodiments, the device components could be positioned differently on a pedal, however. For instance, housing 36 could be positioned on a bottom or a side surface of pedal 14.

Figure 11:
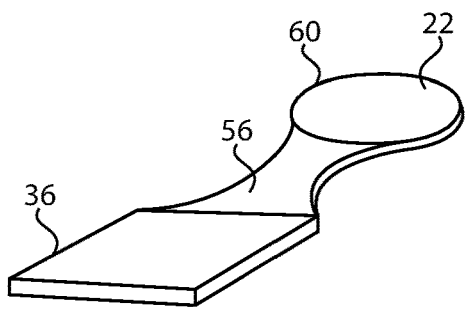
FIG. 11 is a diagrammatic view of a page turning device, according to still another embodiment.
Figure 12:
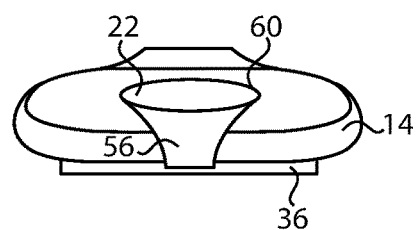
FIG. 12 is a diagrammatic view of the page turning device of FIG. 11 upon a pedal.
Figure 13:
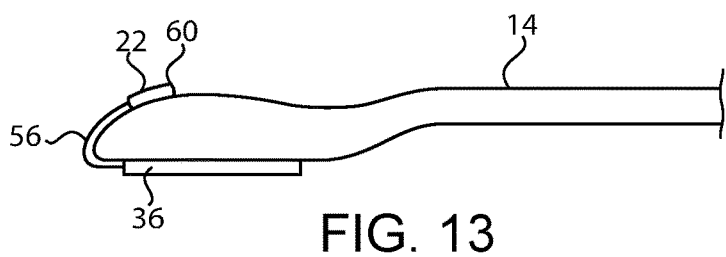
FIG. 13 is another diagrammatic view of a page turning device of FIGS. 11 and 12 upon a pedal.

Referring now to FIGS. 11-13, a page turning device 60 is shown according to still another embodiment. Device 60 is shown without pedal 14 in FIG. 11. Like device 50, device 60 might include only one sensor, but could also include two or more sensors. As can be seen, sensor 22 may be coupled with housing 36 by flexible connection 56. Device 20 of the present embodiment may include an adhesive (not visible) applied to a surface of device 60 for removably or non-removably attaching device 60 to pedal 14. In FIGS. 12 and 13, front and side views of device 60 upon pedal 14 are shown according to the present embodiment. Housing 36 may be positioned on a bottom surface of pedal 14, with sensor 22 positioned on a top surface and flexible connection 56 extending therebetween. The adhesive may be any suitable type of glue or other adhesive for removably or non-removably attaching device 60 to pedal 14. In a practical implementation strategy, device 60 could include a pre-applied adhesive with a protective sheet thereon. A user could remove the protective sheet to expose the adhesive and stick device 60 on pedal 14. In other embodiments, device 20, 50, 60 could instead be attached to pedal 14 using a magnet, a clip, or any other mechanism or strategy. For instance, device 20, 50, 60 may include a molded formation of a hard material, such as a hardened plastic, that might be molded to match a shape of pedal 14, permitting device 20, 50, 60 to be snapped thereon. In another embodiment, device 20, 50, 60 could include a formation of a moldable material such that device 20, 50, 60 can be attached to pedals 14 having a wide array of sizes and shapes by manually conforming the moldable material to the contours of the pedal 14.

Figure 14:
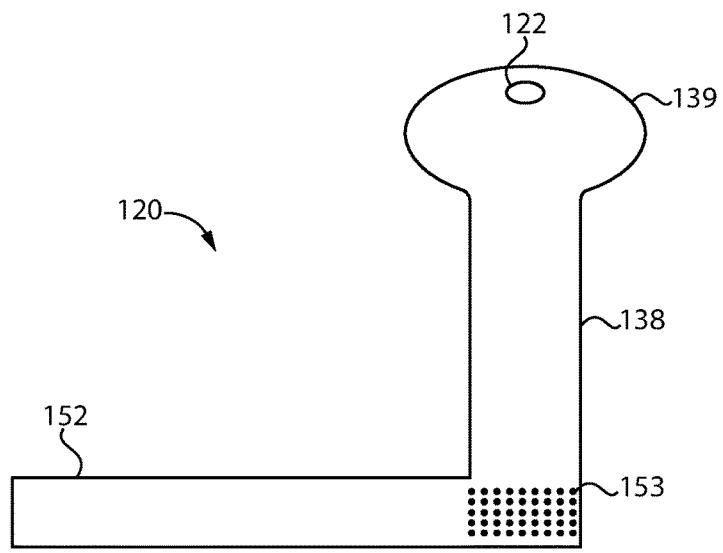
FIG. 14 is a diagrammatic view of a page turning device, according to still another embodiment.
Figure 15:
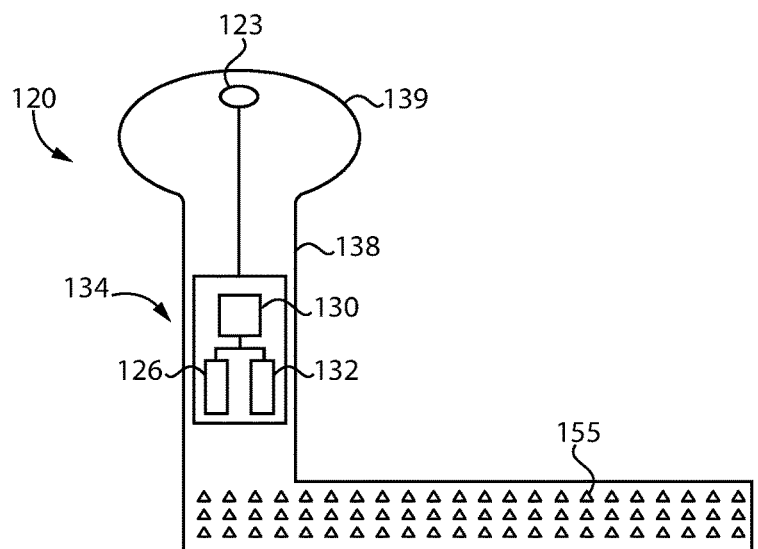
FIG. 15 is another diagrammatic view of the page turning device of FIG. 14.
Figure 16:
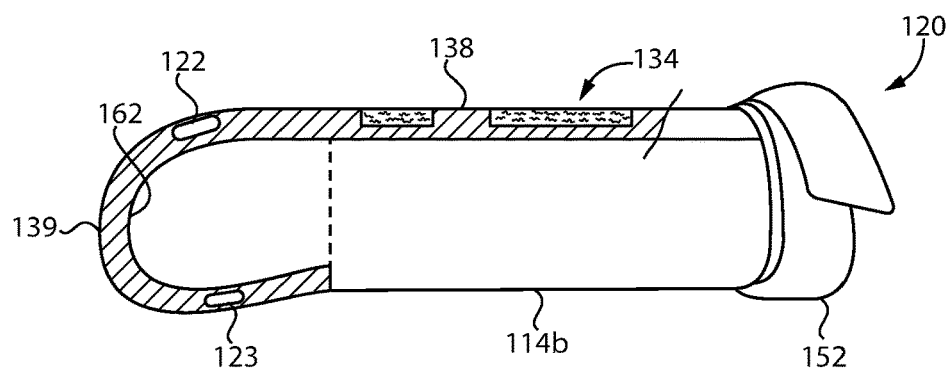
FIG. 16 is a partially sectioned side diagrammatic view of the page turning device of FIGS. 14 and 15 upon a pedal.

Referring now to FIG. 14, there is shown a page turning device 120 according to another embodiment and including a body 139, and a shaft or stem 138 connecting between body 139 and a fastener 152. Body 139 can be understood as a sleeve within the present context, having a blind end. Fastener 152 may include a flexible fabric band or the like having loops 153 in the nature of loops for a hook and loop style attachment similar to Velcro or the like. A sensor 122 is attached to or resident in body 139. It should be appreciated that discussion herein of features or functionality of any one embodiment should be understood by way of analogy to any other embodiment, except where otherwise indicated or apparent from the context. Referring also to FIG. 15, there is shown a bottom view of page turning device 120 and showing a second sensor 123 attached to or otherwise resident in body 139, control circuitry 134 including a processor 130, memory 132, and a transmitter 126. It will be appreciated that control circuitry 134 can also include a power supply (not shown), again analogous to preceding embodiments, and includes or is part of a control mechanism having functionality similar to that described in connection with other embodiments herein. The bottom view of strap 152 illustrates hooks 155 which can engage with loops 153 when fastener 152 is extended about a musical instrument pedal as discussed herein. Fastener 152 could include a clamp, an elastic band, or any other suitable type of fastener, alternatively. FIG. 16 illustrates a side view, partially sectioned, of page turning device 120, where fastener 152 is shown wound about musical instrument pedal 14*b*. It can be seen that body 139 has a void 162 formed therein that receives an end of pedal 14*b*. Shaft 138 is shown extending along a top of pedal 14*b*. It should be appreciated that shaft 138 might be formed of a relatively more rigid material than body 139, although the present disclosure is not thereby limited. Materials contemplated herein for body 139 and the body in other embodiments could include silicone as noted, but could also include leather, synthetic leather, a woven fabric, including natural fibers or synthetic fibers, and still other materials including polymeric materials of many types. Shaft 138 could include a polymeric plastic material, a metal material, or still another.

Figure 17:
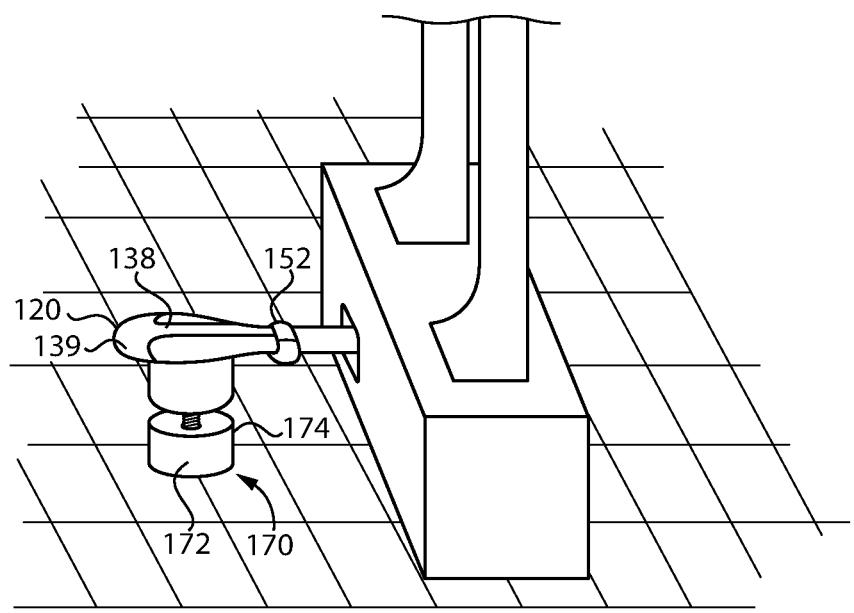
FIG. 17 is a diagrammatic view of the page turning device of FIGS. 14-16 installed on a musical instrument.

Turning now also to FIG. 17 there is shown page turning device 120 as it might appear installed on a musical instrument, where only a single pedal is shown for clarity of illustration, but would typically be the middle pedal on a piano or other keyboard instrument. Incorporated into a system for controlling a display of digital sheet music, a stand 170 or the like may be provided that is fitted underneath the musical instrument pedal. In the illustrated embodiment stand 170 includes a first or lower stand piece 172, and a second or upper stand piece 174, and a connector 176 coupling first stand piece 172 to second stand piece 174. Stand 170 can have an adjustable height, enabling it to be fitted under the musical instrument pedal, to give page turning device 120 support. When a user activates page turning device 120, the musical instrument pedal does not depress, but stays in place. Stand 170 therefore has multiple functions, giving stability to the musical instrument pedal so that the pedal does not depress when stepped on, and suspending the functionality of the pedal while the page turning device 120 is in use. In a practical implementation, control circuitry is resident in or on body 139 or shaft 138 of page turning device 120, however, in other embodiments the control circuitry could be housed in stand 170. For example, a battery could be positioned in stand 170 and electrically connected with sensor(s) in body 139. First stand piece 172 and second stand piece 174 could be rotated relative to one another where connector 176 is threaded to raise or lower the height of stand 170. For example, connector 176 might be rotatably engaged by way of threads with one of stand piece 172 and stand piece 174 and rotatably fixed relative to the other of stand piece 172 and stand piece 174, such that relative rotation between the two stand pieces causes them to come closer together or further apart to vary their height. A variety of other embodiments are contemplated that could enable the telescoping functionality of stand 170, including a frictional engagement between two stand pieces, springs, twist lock arrangements, and a variety of others. Stand 170 could be attached to body 139 or formed integrally therewith, for example.

INDUSTRIAL APPLICABILITY

As discussed previously, it has been observed that state of the art systems and devices for displaying and/or controlling a display of digital sheet music generally require users to purchase and transport a stand-alone trigger assembly, usually in the form of an arrangement of pedals separate and apart from pedals 14. While these systems and devices may be effective in certain ways, it will be appreciated that they may be unduly expensive and cumbersome in many contexts. For instance, the required displacement of a user's feet from the organic playing position in some musical instruments can make operation of such systems and devices uncomfortable, unwieldy, or difficult as the user must move his or her foot between the instrument pedals and the device while maintaining visual focus on the display of digital sheet music. Thus, users risk missing the device, and therefore failing to timely advance the digital sheet music, or must look away from the display to locate the device. Devices 20, 50, 60, 120 may not be subject to the above-referenced limitations of known strategies, however. For instance, placement of the page turning device 20 upon pedal 14 may allow users to more easily activate device 20 while playing a musical score. Further, device 20 may be relatively small and lightweight, and may not include wires or plugs, which might facilitate transport and storage. Further still, device 20 may have fewer components than a stand-alone device, including fewer mechanically actuated components, which may allow device 20 to be produced more cost effectively and allow device 20 to have a longer service life than other page turning devices. These advantages and other advantages will be apparent to those of skill in the relevant arts from the discussion herein.

Referring now again to the Figures generally but with reference to device 20 in system 10, it can be seen that piano 12 includes three pedals 14, which is typical for keyboard instruments. For instance, piano 12 may include a left pedal (e.g., the soft or una corda pedal) 14a, a middle pedal (e.g., the sostenuto pedal) 14b, and a right pedal (e.g., the sustaining or damper pedal) 14c. While piano 12, as illustrated herein, may be typical with regard to the quantity and arrangement of pedals 14, the present disclosure is not thusly limited, and may be deployed in connection with keyboard instruments—or other types of musical or non-musical instruments—having a greater or fewer pedals 14, different types of pedals 14, or different configurations of pedals 14. In many contexts, it may be desirable to fit device 20 on middle pedal 14b. For instance, those of skill in the musical arts will appreciate that the middle or "sostenuto" pedal 14b is rarely used by many pianists and therefore fitting device 20 thereon may enhance the instrument's functionality without interfering with the performance of a musical work. Of course, embodiments in which device 20 is fitted upon a different pedal 14a, 14c, or on a different structure altogether, are also contemplated.

Deployment of the present disclosure may allow a user to change a display of digital sheet music or other media without using his or her hands. For instance, the user may be able to tap device 20 with his or her foot to cause the desired action in computer 16. To do so, the user can attach device 20 to pedal 14 by, for example, slipping sleeve 38 thereon, and may position computer 16 on piano 12, on a stand, or however or wherever else he or she desires. Device 20 can then be communicatively coupled with computer 16, which will typically be a computing device with an integrated display 46, such as tablet computer (e.g., an iPad®), a smart phone, or a laptop, but could be any other suitable computing device that includes or is associated with a display (e.g., a desktop computer). Computer 16 and device 20 may be communicatively coupled by, for example, pairing via a Bluetooth® connection.

Computer 16 may include one or more software programs or applications capable of displaying stored or downloaded digital sheet music. Such a program could be a proprietary music reading application in some embodiments, such as forScore, MobileSheets, Musicnotes®, piaScore, or could be a utility for displaying both digital sheet music and other, non-music media, such as a PDF or JPEG viewer. Once the user opens the software and loads the desired selection of digital sheet music, the user may then be able to use device 20 to change the display in one or more ways. For example, in an embodiment, should the user desire to advance the digital sheet music to show a subsequent page, the user may tap the top side of device 20 once. Such activation may be detected by sensor 22. Through operation of control mechanism 28 and transmitter 26, device 20 may generate a page turning command and transmit the page turning command to computer 16. Upon receiving the page turning command, computer 16 may execute the command, resulting in the digital sheet music advancing on display 46. As discussed above, in some embodiments, the user might be able to tap the bottom side of device 20 or tap the top side of device 20 twice to display the previous page, or might be able to activate device 20 in a number of other ways to cause a different change. Once the user is finished playing piano 12, he or she may leave device 20 in place or could remove device 20 for transport or storage.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. It will be appreciated that certain features and/or properties of the present disclosure, such as relative dimensions or angles, may not be shown to scale. As noted above, the teachings set forth herein are applicable to a variety of different instruments, implements, and the like having a variety of different structures than those specifically described herein. Other aspects, features, and advantages will be apparent upon an examination of the attached drawings and appended claims. As used herein, the articles "a" and "an" are intended to include one or more items, and may be used interchangeably with "at least one." Where only one item is intended, the term "one" or similar language is used. Also, as used herein, the terms "has," "have," "having," or the like are intended to be open-ended terms.

What is claimed is:

1. A page turning device for changing a display of digital sheet music, comprising:
   a sleeve including a deformable body structured to removably fit the page turning device upon a musical instrument pedal; and
   control circuitry attached to the sleeve, and including a sensor structured to produce a sensor signal responsive to a user contacting the page turning device, a power supply, a wireless transmitter, and a control mechanism structured to receive the sensor signal and responsively output a page turning command to a computer by way of the wireless transmitter;
   the sleeve extending between an open sleeve end forming an opening structured for fitting the sleeve over a neck portion of the musical instrument pedal, and a closed sleeve end that is opposite to the open sleeve end enlarged relative to the open sleeve end, and the closed sleeve end having a void formed therein for receiving a head portion of the musical instrument pedal.

2. The device of claim 1 wherein the sensor includes a tactile sensor.

3. The device of claim 2 further including a second tactile sensor structured to produce a second sensor signal responsive to a user contacting the page turning device.

4. The device of claim 1 wherein the sleeve includes a shaft forming the open sleeve end and a fastener attached to the shaft, for fastening the page turning device to the musical instrument pedal.

5. The device of claim 1 wherein the sensor is a pressure-sensitive sensor structured to detect an applied force indicative of a user activating the page turning device.

6. The device of claim 4 wherein the sensor is a piezoelectric sensor, a piezoresistive sensor, or a membrane switch.

7. The device of claim 1 wherein the wireless transmitter is a Bluetooth antenna.

8. A piano system, comprising:
   a piano having a plurality of pedals including a sostenuto pedal having a neck portion and a head portion;
   a computer including a display for displaying digital sheet music, supported upon the piano;
   a page turning device including a power supply, a sensor structured to produce a sensor signal responsive to a user contacting the page turning device, a control mechanism structured to output a page turning command responsive to the sensor signal, and a wireless transmitter; and
   the page turning device being fitted upon the sostenuto pedal and communicatively coupled with the computer, and including a sleeve forming an open sleeve end extending around the neck portion of the sostenuto pedal, and a closed sleeve end forming a void receiving the head portion of the sostenuto pedal.

9. The system of claim 8 wherein the page turning device further includes a fastener for removably coupling the page turning device to the pedal, and the fastener secures the open sleeve end about the neck portion of the sostenuto pedal.

10. The system of claim 9 wherein the fastener includes a strap extending about the pedal.

11. The system of claim 9 wherein the page turning device includes a shaft connecting the body to the fastener.

12. The system of claim 8 wherein the page turning device further includes a stand positioned under the pedal.

13. A method of reading or displaying digital sheet music comprising:
    fitting a page turning device upon a sostenuto pedal of a piano;
    activating the page turning device fitted upon the sostenuto pedal of a piano by contacting the page turning device;
    producing a sensor signal responsive to the activating of the page turning device;
    wirelessly transmitting a command from the page turning device based on the sensor signal;
    changing a computer display of a computer supported upon the piano responsive to the wirelessly transmitted command; and
    the fitting of the page turning device upon a sostenuto pedal further includes deforming a body of the page turning device, and slipping the page turning device upon the sostenuto pedal, such that the body extends along a length of the sostenuto pedal, at least a portion of the sostenuto pedal is received in a void formed in the body, and the page turning device is in contact with a top surface and a bottom surface of the pedal.

14. The method of claim 13 wherein activating the page turning device further includes tapping the page turning device to activate a sensor attached to a sleeve of the page turning device and positioned between an upper side of the sostenuto pedal and an exposed upper surface of the sleeve.

15. The method of claim 13 wherein the wirelessly transmitting of a command further includes wirelessly transmitting a page turning command responsive to the sensor signal.

16. The method of claim 13 wherein the wirelessly transmitting of the page turning command further includes wireless transmitting from the page turning device to a tablet computer display.

17. The method of claim 14 further including communicatively coupling the page turning device with a computer coupled with the computer display.

18. The method of claim 17 wherein communicatively coupling the page turning device with the computer includes pairing the page turning device with the computer by way of Bluetooth.

19. The method of claim 13 wherein the fitting of the sleeve of the page turning device further includes deforming a sleeve of the page turning device to fit the page turning device over a head portion and a neck portion of the sostenuto pedal, and securing the page turning device fitted upon the sostenuto pedal using a fastener.

* * * * *